Dec. 18, 1923.
M. L. KAPLAN
ELECTRIC BATTERY LAMP
Filed Nov. 9, 1921
1,477,877
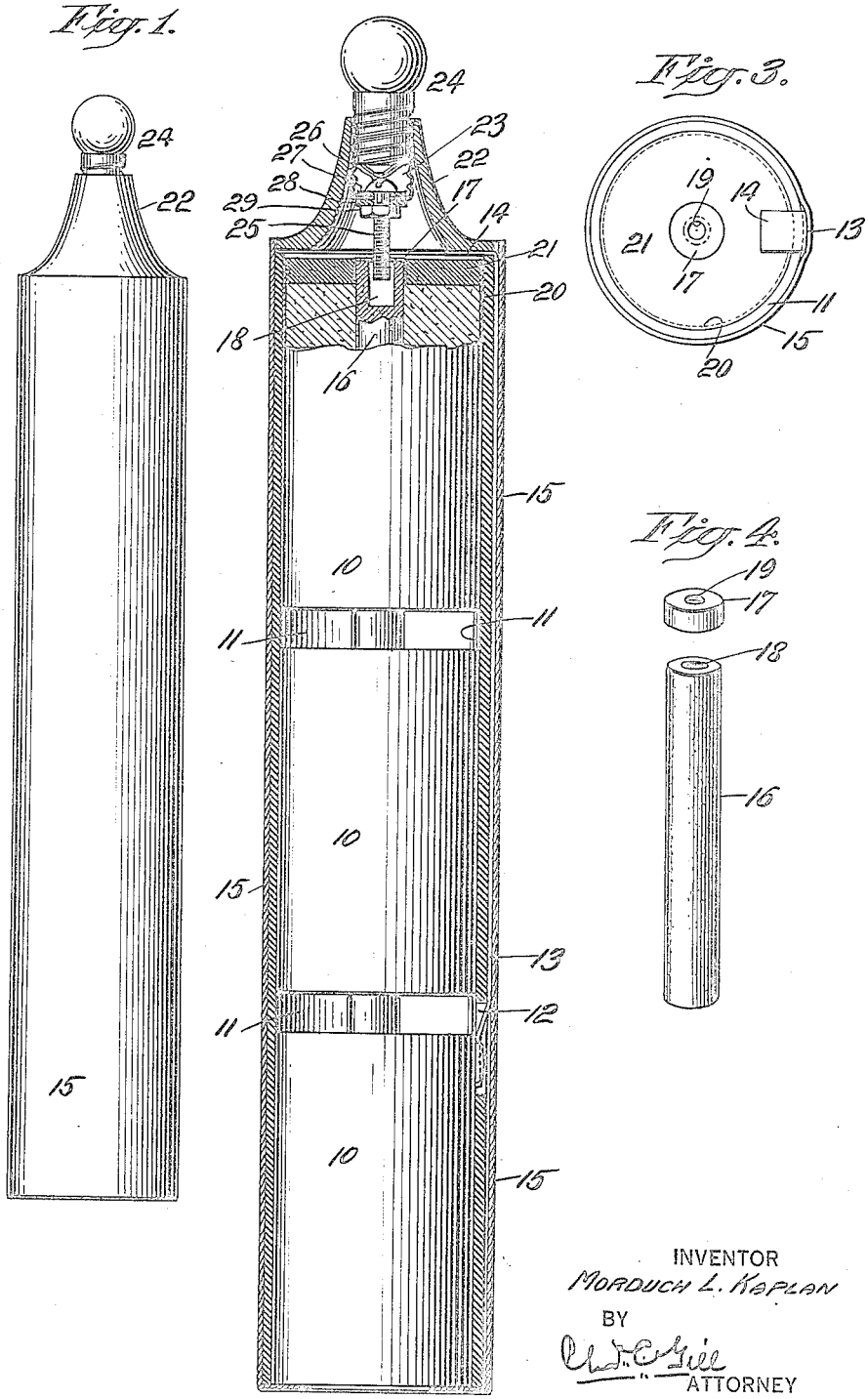
INVENTOR
MORDUCH L. KAPLAN
BY
ATTORNEY Patented Dec. 18, 1923.

1,477,877

UNITED STATES PATENT OFFICE

MORDUCH L. KAPLAN, OF BROOKLYN, NEW YORK.

ELECTRIC-BATTERY LAMP.

Application filed November 9, 1921. Serial No. 514,012.

*To all whom it may concern:*

Be it known that I, MORDUCH L. KAPLAN, a citizen of the United States, and a resident of Brooklyn, in the county of Kings and State of New York, have invented certain new and useful Improvements in Electric-Battery Lamps, of which the following is a specification.

The invention relates more particularly to electric battery lamps possessing a battery and a miniature electric lamp bulb and adapted to stand on a table or the like.

One object of my invention is to simplify, cheapen and extend the use of electric battery and candle lamps.

The battery lamp of my present invention preferably comprises a plural cell battery and a cap or dome detachably applied on the upper end thereof and detachably receiving a miniature electric lamp bulb in a manner adapting the same for electrical connection with the positive pole of the battery through the means securing the cap or dome in position, said cap or dome being adapted when positioned on the battery to enter into electrical connection with the negative pole thereof. The circuit through the lamp and battery may be made or broken by using the lamp bulb as a switch, the circuit being completed when the lamp bulb is screwed downwardly and broken when said lamp bulb is screwed upwardly. The cap or dome, which is of conducting material, may also be used for making and breaking the circuit, the circuit being completed, assuming that the lamp bulb is in position, when the said cap or dome is moved downwardly into engagement with the negative element of the battery and broken when said cap or dome is moved upwardly from such engagement. The circuit through the lamp and battery may also be made and broken in other ways.

In carrying out my invention, in the preferred embodiment thereof, I provide the cap or dome with a conducting and securing screw in position to be engaged at one end by the lower terminal of the lamp bulb and to engage at its other end the positive element of the battery and secure the cap or dome on the battery. I do not add to the positive element of the battery for connecting the same with or receiving the aforesaid screw, but on the contrary form a vertical socket in the upper portion of the carbon rod of or for the upper cell of the battery and a hole in the usual brass cap which surmounts said rod and introduce the lower portion of said screw through said hole and into said socket. Preferably the hole through the aforesaid cap will be slightly less in diameter than the aforesaid socket so that the securing screw will not wear away or disturb the carbon, and I have found that the thread on the screw will form its own engaging flange about the hole in said cap, the latter being of thin material, without the necessity of tapping said hole. A conductor is carried from the negative pole or zinc of the lower cell of the battery to the upper end of the battery to be engaged by the aforesaid cap or dome.

The invention will be fully understood from the detailed description hereinafter presented, reference being had to the accompanying drawings, in which:

Fig. 1 is a side elevation of an electric candle-lamp embodying my invention;

Fig. 2 is a vertical section, on a larger scale, through the same, the upper cell of the battery being shown as partly broken away;

Fig. 3 is a top view of the battery, the cap or dome and lamp bulb having been detached therefrom, and Fig. 4 illustrates in perspective the carbon rod for the upper battery cell and the metallic cap for application thereon, said rod and cap being usual elements of a battery with the exception that in this instance the upper end of the rod is formed with a socket or recess and the cap is formed in its top with a hole aligning with and being slightly less in diameter than said socket.

In the drawings, illustrating one embodiment of my invention, 10 designates the cells of the battery, one cell being placed above another in series as is usual in vertical plural cell batteries, and said cells in the completion of the battery are enclosed in a pasteboard cylinder, carton or the like 11, which insulates and keeps the cells together and permits them to be handled as a unit. The cylinder or carton 11 is of customary character, with the exception that adjacent to the lower cell 10 I provide the same with an opening 12 through which I extend a conductor 13 from the zinc or negative element of the lower cell 10 to the upper end of the battery and bend the upper end of the same over the upper edge of the carton 11 to form a contact lip 14. The conductor 13 may be secured at its lower end by solder to the zinc of the lower cell 10 and will thence extend upwardly exterior to the carton 11 to the upper end of the battery, being insulated by said carton from the upper cells of the battery. Upon the exterior of the carton 11 and concealing the conductor 13 I provide a wrapping of paper or other suitable material 15 which may be of ornamental character and add a finish to the candle lamp, and said wrapper 15 will preferably extend below the bottom of the lower cell 10, as shown in Fig. 2.

The upper cell 10 contains a carbon rod or positive element 16 surmounted by a brass or metallic cap 17, said parts being of the usual construction with the exception that in accordance with my invention I form in the upper end of the rod 16 a concentric recess or socket 18 and provide in the top of the cap 17 a hole 19 which aligns with said socket and is slightly less in diameter than the socket. With the exception of the socket 18 and hole 19, the rod 16 and cap 17 are of the usual well-known construction. It is usual in the construction of batteries to apply a layer of sealing wax, pitch or the like, within the zinc shell, at the top of the same, this material having its upper surface below the top of the brass cap surmounting the carbon rod, whereby said cap is allowed to project outwardly for direct electrical engagement with the lower terminal of the lamp bulb.

In my preferred construction I fill the upper end of the zinc shell, numbered 20 in Fig. 2, with the sealing wax, pitch or the like, above the level of the upper edge thereof, and about to a level with the upper end of the cap 17, so that the upper end of the upper cell of the battery presents practically a smooth surface, as shown in Fig. 2, in which the filling material or head is numbered 21.

The main cap or dome for the candle-lamp is numbered 22 and is preferably of approximately cone-outline and flared outwardly at its base portion to imitate in outline the upper end of a wax candle and also to cover over and conceal the upper end of the battery. The cap or dome 22 will be formed wholly or in part of metal or other conductive material, and in its apex said cap or dome is provided with a concealed threaded metal sleeve or socket 23 adapted to detachably receive a miniature electric lamp bulb 24 of usual type, one of whose terminals becomes placed in electrical connection with the cap or dome 22 by said sleeve. The lower end of the sleeve or socket 23 is flanged inwardly, as shown in Fig. 2, to form a bottom for the socket having a central vertical opening or hole therein. I secure to the bottom of the sleeve or socket 23 a metal screw 25 whose head 26 is within the sleeve or socket 23 and positioned to be engaged by the lower terminal of the lamp bulb 24 upon the application of said bulb to operative position within said sleeve or socket. The screw 25 is insulated from the sleeve or socket 23 by means of a washer 27 of insulating material upon which the screw-head 26 bears and by means of a corresponding washer 28 on said screw and bearing against the lower exterior end of the sleeve or socket 23 and also from the fact that the hole in the bottom of the sleeve or socket 23 is greater in diameter than said screw, whereby the screw becomes spaced from said bottom, as shown in Fig. 2. Upon the screw 25 I apply a nut 29 which engages the washer 28 and serves, with the head 26 and interposed washers 27, 28, to bind the screw 25 firmly in position centrally and to the bottom of the sleeve or socket 23. The screw 25 is carried by the cap or dome 22 and is utilized as a conductor and as the means for detachably connecting said cap or dome with the upper end of the battery. The threaded stem of the screw 25 projects downwardly below the cap or dome 22, and in the application of said cap or dome to the battery the lower end of said stem is screwed into the hole 19 of the cap 17 and enters the socket 18 in the carbon rod 16, said screw engaging with thread-effect said cap 17 at the edges of the hole therein and preferably being clear of the walls of said socket 18. I have not found it to be necessary to tap the hole 19, since the cap 17 is of thin metal and the screw 25 will form its own engaging flange at the edge of said hole. If preferred, however, the hole 19 and also the walls of the socket or recess 18 may be tapped to provide threads to be engaged by the thread on the screw 25.

My candle-lamp comprises two main parts, one being the plural cell battery having the negative conductor 13 and the other being the cap or dome 22 equipped with the lamp-bulb 24, sleeve 23 therefor and securing screw or the like 25. The cap or dome 22 may be readily applied to position on the battery by means of the screw 23, the said cap or dome being rotated between the thumb and fingers as a handle for applying the screw to the cap 17 and carbon rod 16, and said cap or dome 22 when in position is close over and conceals the upper end of the battery and is in electrical connection with the negative pole thereof by reason of its engagement with the contact lip 14 on the upper end of the conductor 13. The lamp bulb 24 may be applied to the cap or dome 22 either before or after said cap or dome has been secured to the battery, and when said bulb is in operative position its lower terminal will engage the head of the screw 25 and hence become in electrical connection with the positive pole of the battery. When the cap or dome 22 is in engagement with the conductor 13 and the lower terminal of the lamp-bulb 24 is engaged with the head of the screw 25, the circuit will be completed through the lamp and battery and the lamp will light. In order to break the circuit and extinguish the light, the lamp-bulb 24 may be screwed upwardly to separate its lower terminal from the screw 25 or the cap or dome 22 may be screwed upwardly to separate its lower edge from the conductor 13, and hence either the lamp-bulb or said cap or dome may be utilized as a make and break switch.

My purpose is that the cap or dome 22 shall be of durable nature and used on successive batteries as the latter become exhausted and are replaced and that batteries of the construction described shall be commercially sold to receive the cap or dome 22. My invention dispenses with expensive fittings and stands for holding the battery, since the battery will stand on end and the inexpensive wrapping thereon serves to impart an attractive appearance or finish thereto. The cap or dome 22 may be quickly applied to and removed from the battery, and while said cap or dome is of a character adapting it for repeated use it is of itself inexpensive of manufacture.

I prefer to use a plain cap 17 of the character shown for the carbon rod 16 but said cap may be variously constructed, since its purpose is to serve as a protective feature for the carbon rod 16 and as a nut to receive the screw 25. My invention is not, therefore, confined to the technical cap or nut 17 illustrated.

It is advantageous to have the screw 25 project below the cap or dome 22, since thereby the lower end of the screw becomes exposed and may be readily applied to and connected with the positive element of the upper cell of the battery.

I do not limit my invention to all the mechanical details hereinbefore specifically described as suggesting the preferred embodiment of my invention, since I am aware that these details may be modified without departure from the spirit of my invention and within the scope of the appended claims.

I have described the recess or socket 18 as formed in the upper end of the carbon rod 16, but said socket may, if preferred, be extended entirely through said rod without prejudice to my invention. It is sufficient for my purpose, however, that the socket 18 be confined to the upper end only of the rod 16.

What I claim as my invention and desire to secure by Letters Patent, is:

1. An electric-battery lamp of the character described, comprising a plural cell battery, a conductive cap thereon and carrying an electric lamp bulb detachably applied thereto and having one terminal in electrical connection therewith, a conductor extending from the negative element of the lower cell of the battery to a position for electrical connection with said cap, and means for detachably securing said cap to the positive element of the upper cell of the battery comprising a screw depending from said cap below the electric lamp bulb and adapted to be engaged at its upper end by the lower terminal thereof, and a socket in the carbon of the upper battery-cell and a hole above said socket in the cap surmounting said carbon to receive the lower portion of said screw.

2. An electric battery lamp as defined in claim 1, having the socket in said carbon of slightly greater diameter than said hole in said cap mounted on said carbon.

3. An electric-battery lamp of the character described, comprising a plural cell battery the carbon of whose upper cell is formed in its upper end with a socket and has on said end a metal cap formed with a hole aligned with said socket, a cap or dome for detachable application to the upper end of the battery and carrying an electric lamp bulb detachably applied thereto, conductive means for securing said cap or dome adapted to the hole in said metal cap and said socket, said conductive securing means being positioned for electrical connection with one terminal of said lamp bulb, and means for completing the circuit from the negative pole of the battery through the other terminal of said lamp bulb.

4. An electric lamp of the character described, comprising a plural cell battery the carbon of whose upper cell is formed in its upper end with a socket and has on said end a metal cap formed with a hole aligned with said socket, a cap or dome for detachable application to the upper end of the battery and carrying an electric lamp bulb detachably applied thereto, a screw carried by said cap or dome and adapted to enter the recess of said carbon and engage the cap thereon at the hole therein for securing said cap or dome, said screw being positioned for electrical connection with one terminal of said lamp bulb, and means for completing the circuit from the negative pole of the battery through the other terminal of said lamp bulb.

5. An electric-battery lamp of the character described, comprising a plural cell battery the carbon of whose upper cell is formed in its upper end with a socket and has on said end a metal cap formed with a hole aligned with said socket and which cell has the upper edge of its zinc shell below the level of the top of said metal cap and its top filling of sealing wax or the like extended up to about a level with the top of said cap and over the upper edge of said shell, a conductor extending from the negative element of the lower cell to the top of the battery and bent over the upper cell thereof, a cap or dome for detachable application to the upper end of the battery and carrying an electric lamp bulb detachably applied thereto, conductive means for securing said cap or dome adapted to the hole in said metal cap and said socket, said conductive securing means being positioned for electrical connection with one terminal of said lamp bulb, and means for completing the circuit from the upper end of said negative conductor through the other terminal of said lamp bulb.

6. An electric-battery lamp of the character described, comprising a plural cell battery the carbon of whose upper cell is formed in its upper end with a socket and has on said end a metal cap formed with a hole aligned with said socket and which cell has the upper edge of its zinc shell below the level of the top of said metal cap and its top filling of sealing wax or the like extended up to about a level with the top of said cap and over the upper edge of said shell, a conductor extending from the negative element of the lower cell to the top of the battery and bent over the upper cell thereof, a cap or dome of conductive material for detachable application to the upper end of the battery and for electrical connection with the upper end of said negative conductor, a socket in said cap or dome for an electric lamp bulb one terminal of which is in electrical connection with said cap or dome, and a screw carried by and insulated from said cap or dome and adapted to enter the recess in said carbon and engage the cap thereon for securing said cap or dome, said screw being positioned for electrical connection with the lower terminal of the lamp bulb.

7. An electric-battery lamp of the character described, comprising a plural cell battery the carbon of whose upper cell is formed in its upper end with a socket and has on said end a metal cap formed with a hole aligned with said socket, a cap or dome for detachable application to the upper end of the battery and carrying an electric lamp bulb detachably applied thereto, a screw carried by said cap or dome and adapted to enter the recess of said carbon and engage the cap thereon at the hole therein for securing said cap or dome, said screw being positioned for electrical connection with one terminal of said lamp bulb, and means for completing the circuit from the negative pole of the battery through the other terminal of said lamp bulb, said screw having a thread-engagement with the metal cap on said carbon and being less in diameter than the socket in said carbon.

8. An electric-battery lamp of the character described, comprising a plural cell battery the carbon of whose upper cell is formed in its upper end with a socket, a cap or dome for detachable application to the upper end of the battery carrying an electric lamp bulb detachably applied thereto and also conductive means for detachably securing the cap or dome and adapted to said socket, said conductive securing means being positioned for electrical connection with one terminal of said lamp bulb, and means for completing the circuit from the negative pole of the battery through the other terminal of said lamp bulb.

Signed at New York city, in the county of New York and State of New York, this 7th day of November A. D. 1921.

MORDUCH L. KAPLAN.